United States Patent [19]

Schwartzstein et al.

[11] 3,947,917
[45] Apr. 6, 1976

[54] RUNNERS AND ATTACHABLE CASTERS FOR LUGGAGE CASES AND THE LIKE

[75] Inventors: Marvin Schwartzstein, Rydal, Pa.; Richard Molnar, Elmwood Park, N.J.

[73] Assignee: York Luggage Corporation, Lambertville, N.J.

[22] Filed: Oct. 4, 1974

[21] Appl. No.: 512,072

[52] U.S. Cl. ................................. 16/30
[51] Int. Cl.² ........................... B60B 33/00
[58] Field of Search ............... 16/30, 31 R, 31 A; 190/18 A; 280/29; 36/67 D

[56] References Cited
UNITED STATES PATENTS

| | | | |
|---|---|---|---|
| 1,900,672 | 3/1933 | Uhl | 16/30 |
| 2,848,733 | 8/1958 | Thornsbury | 16/30 |
| 2,899,700 | 8/1959 | Egan | 16/30 |
| 3,487,495 | 1/1970 | Schultz | 16/30 |

FOREIGN PATENTS OR APPLICATIONS

310,109  9/1955  Switzerland.............................. 16/30

*Primary Examiner*—Patrick D. Lawson
*Attorney, Agent, or Firm*—Shapiro and Shapiro

[57] ABSTRACT

The runner of a luggage case or the like provides a stud having shoulders engageable by a spring clip or slidable bolt member in a caster for enabling attachment of the caster to the runner.

18 Claims, 15 Drawing Figures

RUNNERS AND ATTACHABLE CASTERS FOR LUGGAGE CASES AND THE LIKE

The invention relates to improvements in runners and casters for luggage cases and the like, and is more particularly directed to luggage case runners which enable attachment thereto of fixed and swivel casters.

BACKGROUND OF THE INVENTION

Casters for luggage cases are well known in the prior art. U.S. Pat. No. 2,392,926 to Kelly, for example, discloses a luggage case having four ball-bearing-type casters permanently mounted to the bottom surface thereof. A strap is provided by (connected to) the case for pulling the case on the casters. The casters, for all practical purposes, cannot be removed from the luggage case by the retailer or the consumer. Thus, the market for this type of luggage case is limited to those prospective purchasers who desire luggage cases having casters permanently affixed thereto. As a result, in order to provide luggage cases of this type as well as cases having the usual feet or runners instead of casters, the retailer must stock two sets of cases.

Practically all luggage cases not having permanent casters affixed thereto have four feet or runners on the underside of the case for providing the support surfaces for the case. Structures for enabling temporary attachment of casters or rollers to these luggage cases typically employ a pair of rollers mounted side-by-side on a long flexible strap which may be tightened about the periphery of the luggage case to secure the rollers near a lower corner of the case. A loose portion of the strap near the upper corner of the luggage case which is diagonally opposite the position of the rollers provides a handle for moving the luggage case on the rollers. Attachable caster structures of this type are cumbersome and difficult to mount. Even when properly mounted, these structures do not provide a rigid connection between the rollers and the luggage case. Consequently, the rollers may shift from proper position during use and eventually may become completely detached from the luggage case. Furthermore, certain luggage cases have configurations which do not permit the use of such structures.

SUMMARY OF THE INVENTION

It is, accordingly, a principal object of the invention to provide apparatus for enabling casters to be attached to luggage cases or the like in fixed positions and without the need for encircling straps or other cumbersome supports.

Pursuant to the above-stated principal object, another object of the invention is to provide runners for luggage cases constructed to permit casters to be attached thereto without the use of tools.

Another object of the invention is to provide improved rigid and swivel caster assemblies for connection to runners of the above-described type.

Runners constructed in accordance with the invention for mounting on the bottom surface of a luggage case have studs which enable connection thereto of caster assemblies made in accordance with the invention, and the runners provide surfaces for suitably supporting the luggage case when casters are not connected thereto.

Rigid and swivel casters in accordance with preferred embodiments of the invention for attachment to the runners include a spring clip or slidable bolt member for releasably connecting the casters to the runners.

A retailer can sell luggage cases having such runners either with or without the casters to suit the requirements of the purchaser, the casters being attachable to and removable from the luggage cases by the retailer or the purchaser without the use of tools. Moreover, the purchaser can use a single set of the casters with any one of several luggage cases having the runners.

The above-described objects and advantages of the invention as well as other advantages and improved results will be apparent from the following detailed description of the invention.

DESCRIPTION OF THE PREFERRED EMBODIMENTS

Runners constructed in accordance with the invention are mounted to the underside of a luggage case or the like in place of the usual feet or runners, which are typically four in number, two runners being mounted on each of a pair of cooperable luggage case sections. As hereinafter described, these runners have configurations which enable the connection thereto of rigid or swivel casters in accordance with the invention and which provide the support surfaces for the luggage case when the casters are not attached. For clarity of illustration, the drawings show only small portions of the bottom wall S of one of a pair of cooperable luggage case sections, and show the different individual runners with relation to fixed and swivel casters of the invention.

Figure 1:
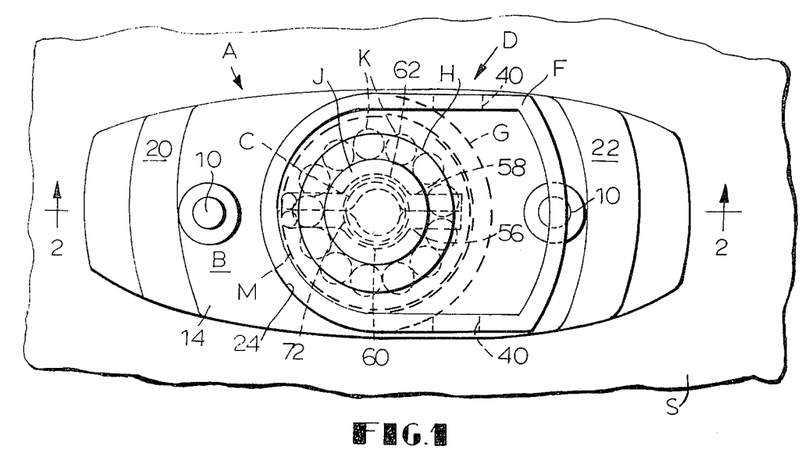
FIG. 1 is a bottom plan view of a swivel caster in accordance with the invention with the roller omitted, this view showing the caster attached to a luggage case runner in accordance with the invention mounted on the bottom wall of a luggage case section.
Figure 2:
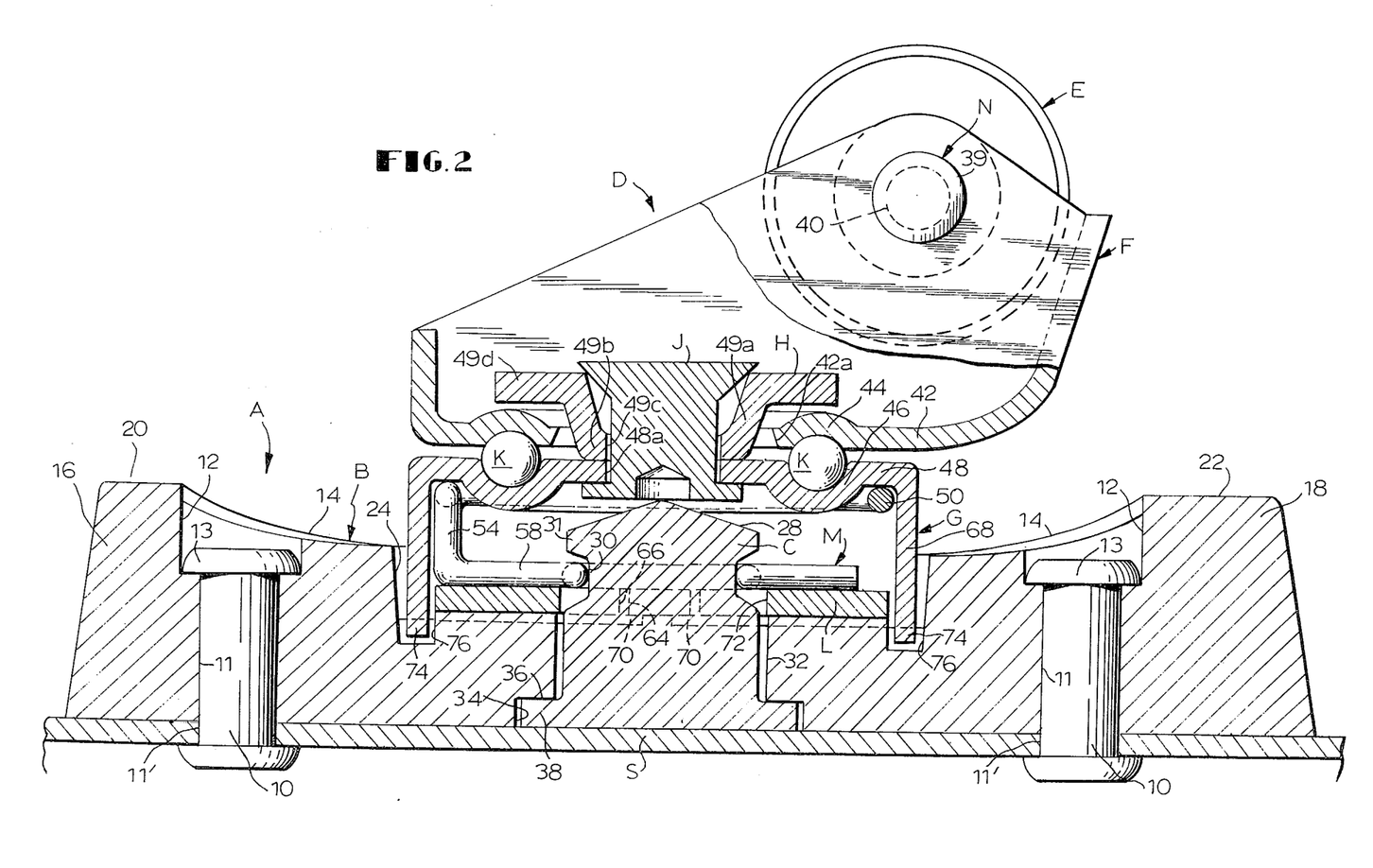
FIG. 2 is a vertical cross-sectional view, on an enlarged scale, taken approximately in the plane of line 2—2 of FIG. 1.

FIGS. 1 and 2 illustrate a preferred embodiment of a luggage case runner A comprising a runner body B which provides a stud C for engagement by a caster, such as swivel caster D. Referring to FIG. 2, the runner body may be formed of any suitable material, such as metal or plastic, and may be attached to the bottom wall S of a luggage case section by any suitable means, such as by headed-over rivets 10 which extend through openings 11 and 11' in the runner body and the luggage case wall, respectively. Openings 11 are enlarged at 12 to receive the headed-over ends 13 of the rivets. If made of metal, it is preferred that the runner be made by die casting and then plated. The bottom surface of the runner, which is shown inverted, is transversely channeled or recessed at 14 to provide longitudinally spaced feet 16 and 18 having planar surfaces 20 and 22, respectively. These surfaces act as the support surfaces for the luggage case to engage a floor when a caster is not attached to the runner. The center of channeled surface portion 14 of the runner is provided with a circular recess 24 for receiving the caster when a caster is attached to the runner, as shown.

Stud C is circular in horizontal cross-section and projects perpendicularly from the bottom of the runner between feet 16 and 18 and into the center of recesses 24 and 14, terminating just short of the plane of support surfaces 20 and 22, as shown in FIG. 2. The projecting end surface 28 of the stud has a cone-shaped taper. The cylindrical surface of the stud just below tapered end surface 28 has a circumferential groove 30 therein for providing the stud with an outer annular shoulder 31 for engagement by a caster. Although stud C may be formed integrally with runner body B, it is preferred that the stud be provided as a separate element, as shown. Preferably, the stud is formed of steel to furnish greater strength. The stud is received by a central cylindrical opening 32 in the runner body. The end of the opening adjacent luggage case wall S is enlarged at 34 to provide a shoulder 36 which is cooperable with an annular flange 38 at the end of the stud for securing the stud in the runner body when the runner body is connected to the luggage case wall by the rivets 10.

Figure 3:
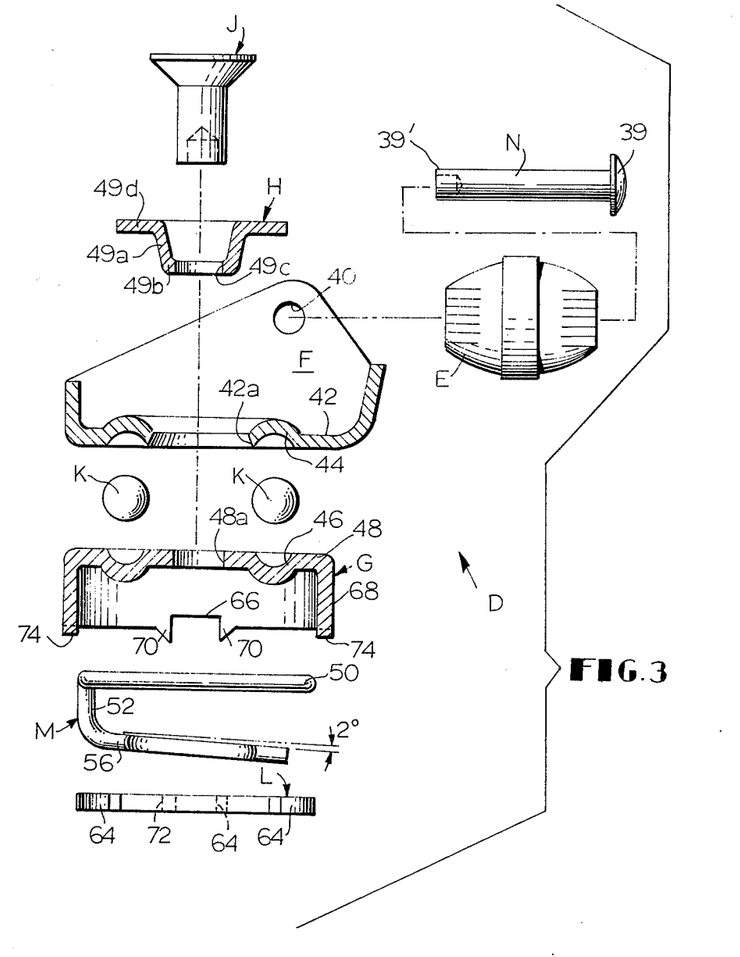
FIG. 3 is an exploded side elevational view, partly in cross section, of the caster of FIGS. 1 and 2.

A preferred embodiment of a swivel caster D for attachment to runner A is illustrated by FIGS. 1–3. Referring to FIGS. 2 and 3, the caster comprises a roller E, a roller housing F, a swivel plate G, a cap H, a stud J, balls K, a cover plate L, a resilient member M, and a pin N.

Referring to FIGS. 2 and 3, roller E is supported for rotation in roller housing F by pin N having its ends received in openings 40 in the roller housing. As shown in FIG. 3, the pin has a head 39 at one end thereof, the other end 39' being headed over to secure the pin to the housing after the pin has been extended through a central opening in the roller E. The end wall 42 of the roller housing has an annularly recessed portion 44 formed therein in alignment with an annularly recessed portion 46 in end wall 48 of swivel plate or housing G, the recessed portions cooperating to provide channels for balls K. With the balls in the channels, the end walls of roller housing and the swivel plate are pivotally connected together by cap H and rivet J to provide a ball-bearing-type swivel action. More specifically, and as shown in FIG. 2, the tapered tubular side wall 49a of cap H is received by a circular opening 42a in end wall 42 of the roller housing. The annular end wall 49b of the cap is secured against end wall 48 of the swivel plate by the rivet J, which extends through aligned circular openings 49c and 48a in end wall 49b of the cap and end wall 48 of the swivel plate, respectively, and is then headed over to secure the parts to each other. The outer, annular flange 49d of the cap is cooperable with recessed portion 44 in end wall 42 of the roller housing to hold the recessed portions 44 and 46 of the roller housing and the swivel plate in engagement with balls K.

Figure 5:
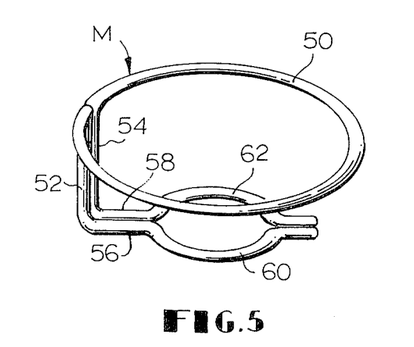
FIG. 5 is a perspective view of a spring clip employed in the caster of FIGS. 1 and 2.

Resilient member M (FIG. 5) comprises a music wire of suitable diameter, for example 0.046 inch, bent to form a spring clip having a circular loop portion 50, linear portions 52 and 54 which extend side-by-side from the ends of the loop perpendicularly from the plane of the loop, and end portions or fingers 56 and 58 which extend generally parallel to the plane of the loop. The fingers have semi-circular portions 60 and 62 formed therein, as shown. Each of these fingers preferably diverges at a small angle, such as 2 degrees, relative to the plane of the loop, as shown in FIG. 3.

Figure 6:
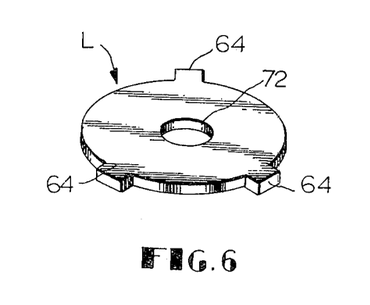
FIG. 6 is a perspective view of a cover plate employed in the caster of FIGS. 1 and 2.

Referring to FIG. 2, spring clip M is held in the swivel plate G by cover plate L. As shown in FIG. 6, the cover plate has three radially extending lugs 64 equally spaced about the periphery thereof and which are received in respective notches 66 (FIG. 3) in the edge of tubular side wall 68 of the swivel plate. Projections 70 on both sides of the notches are bent over the lugs, as shown in FIG. 2, for securing the lugs in the notches to provide a fully enclosed, assembled caster unit. The cover plate thus secured to the swivel plate brings circular portion 50 of the spring clip, which has a diameter slightly less than the inside diameter of the tubular side wall 68 of swivel plate G, into parallel engagement with end wall 48 of the swivel plate and brings spring clip fingers 56 and 58 into parallel engagement with the cover plate, as shown in FIG. 2. Referring to FIG. 1, the semi-circular portions 60 and 62 of the spring clip fingers are concentric with a circular opening 72 provided in the center of the cover plate for receiving stud C, as shown in FIG. 2.

To attach caster D to runner A, swivel plate G of the caster is first aligned with recess 24 in the runner body to align the stud with opening 72 in the cover plate. As the caster is then pushed onto the runner, the conical end surface 28 of the stud acts to spread fingers 56 and 58 of spring clip M apart until the semicircular portions of the fingers snap into groove 30 for engagement with annular shoulder 31 of the stud, as shown in FIG. 2. The caster may be removed from the runner by being pulled outwardly from the runner with sufficient force to disengage the spring clip fingers from shoulder 31 of the stud. However, the configurations of the shoulder and the spring clip require that considerable force be applied to effect disengagement, thereby ensuring against accidental removal of the caster.

For preventing rotation of swivel plate G relative to the runner when the caster is attached thereto, side wall 68 of the swivel plate is provided with a pair of diametrically opposite, axially extending lugs 74 which are received in recesses 76 in runner body B, as shown in FIG. 2.

Figure 4:
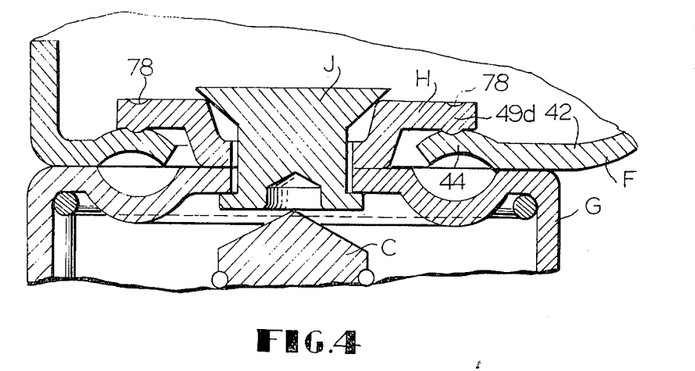
FIG. 4 is a fragmentary longitudinal cross-sectional view of a rigid caster in accordance with the invention.

Referring to FIG. 4, to assemble a rigid caster, balls K are omitted and a plurality of staking points are provided by depressing circumferentially spaced areas 78 around the perimeter of flange 49d on cap H, which in turn force depressions into the annularly recessed portion 44 of swivel plate end wall 42 when rivet J is headed over. It will be apparent that the rigid or non-swivel type of caster is connected to the runner and is disengaged therefrom in the same manner as hereinbefore described with respect to the swivel caster assembly of FIGS. 1–3.

Figure 7:
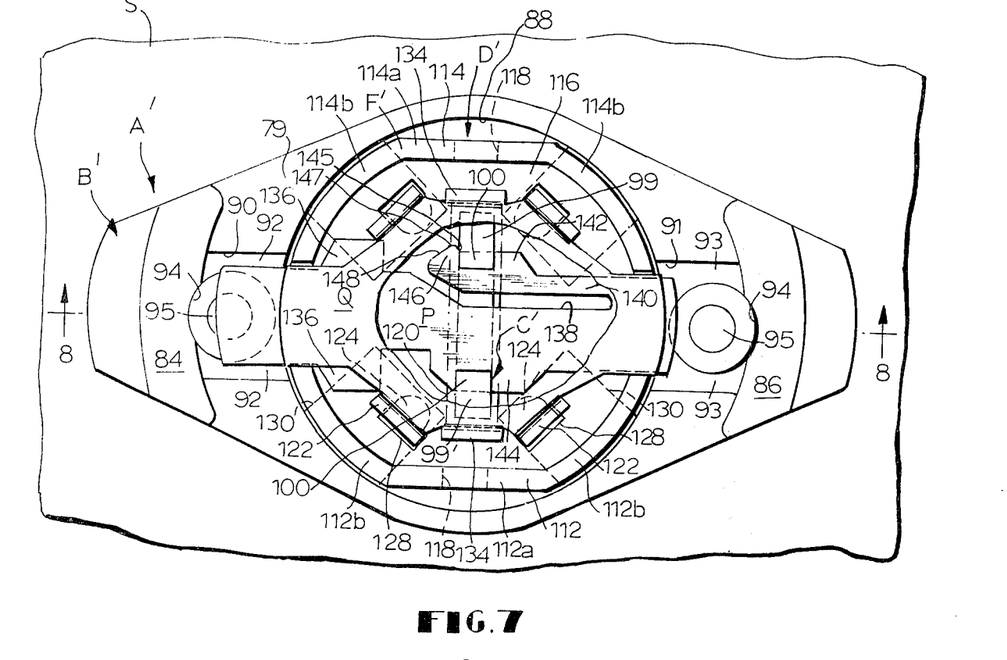
FIG. 7 is a bottom plan view of another embodiment of a caster in accordance with the invention, the roller being omitted for clarity in illustration and with certain parts broken away to expose a bolt member in locking position, this view also showing the caster attached to another embodiment of the luggage case runner.
Figure 8:
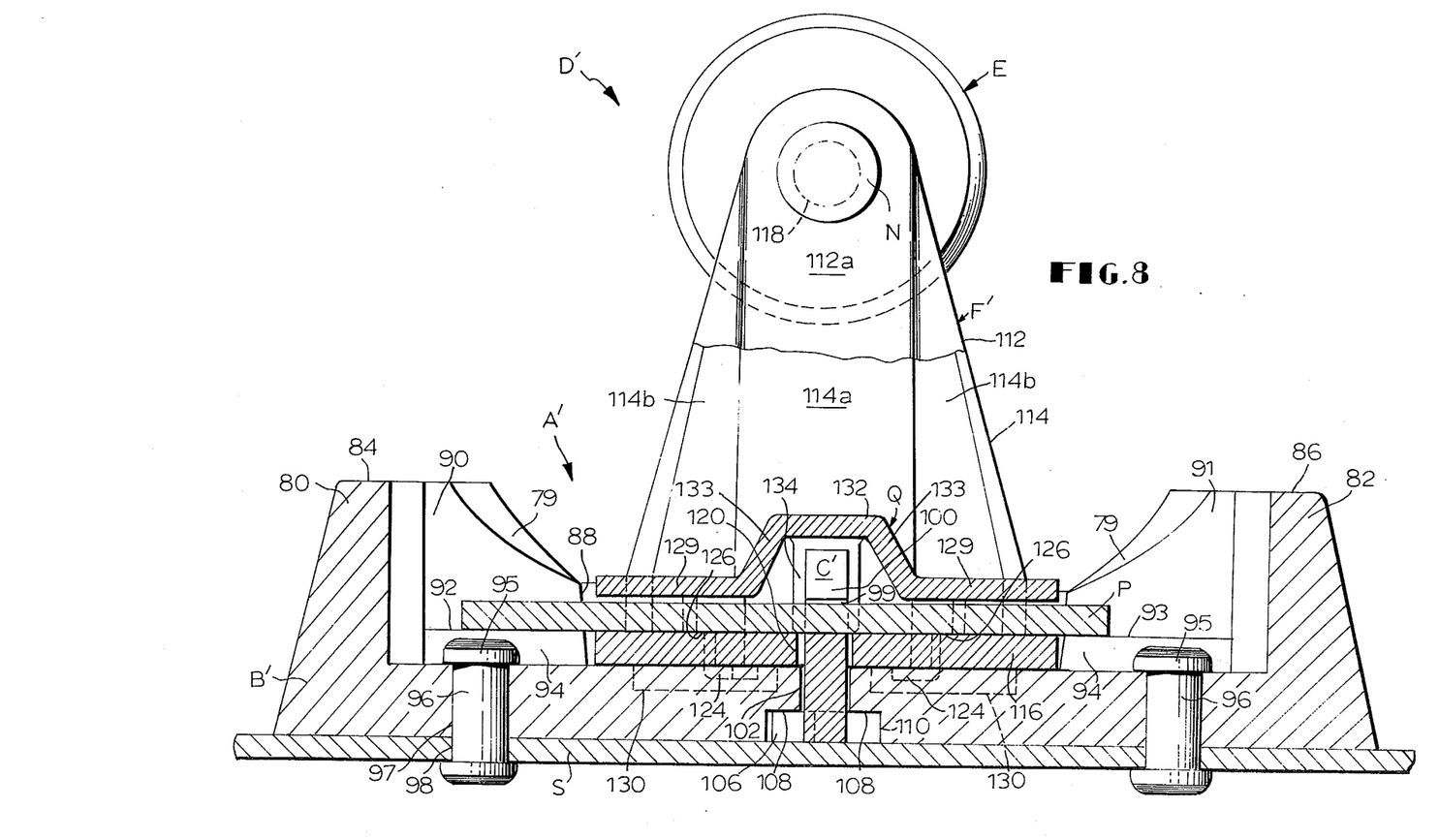
FIG. 8 is a vertical cross-sectional view, on an enlarged scale, taken approximately in the plane of line 8—8 of FIG. 7.

FIGS. 7 and 8 illustrate another runner A' in accordance with the invention mounted on the bottom wall S of a luggage case section. Referring to FIG. 8, which shows the runner in the inverted position, runner A' has a runner body B' providing a stud C' which is releasably engageable by a movable bolt member in a caster, such as the slidable locking bolt member P in fixed caster D' which is shown attached to the runner. The bottom surface of the runner body, which is made of plastic or by die casting a zinc alloy and plating the part, is transversely recessed at 79 to provide two longitudinally spaced feet 80 and 82 having planar surfaces 84 and 86, respectively. These surfaces form the support surfaces for the luggage case when casters are not attached to the runners. Recessed portion 79 of the runner body has a central circular recess 88 therein receiving caster D', as shown. Referring to FIGS. 7 and 8, the runner body is longitudinally recessed at 90 and 91 on opposite sides of and to a lesser depth than recess 88 to provide planar surfaces 92 and 93 for supporting opposite ends of sliding bolt member P. Circular recesses 94 in these surfaces receive the headed-over end portions 95 of rivets 96, which extend through openings 97 and 98 in the runner body and bottom wall S of the luggage case section, respectively, to secure the runner body to the bottom wall.

Figure 12:
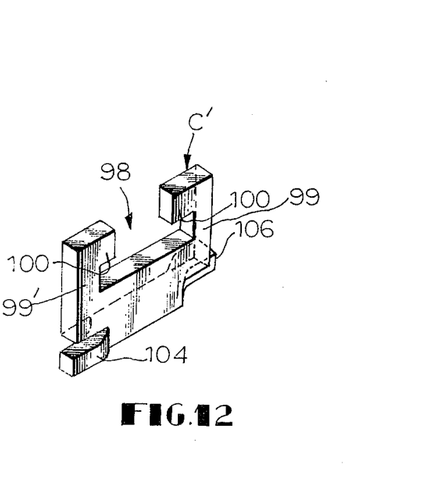
FIG. 12 is a perspective view of a stud employed in the luggage case runner of FIGS. 7 and 8.

Projecting from the runner body into the center of recesses 88 and 79 and between feet 80 and 82 is a transversely elongated stud C' (FIG. 7) which has its exposed end surface below the plane of support surfaces 84 and 86, as shown in FIG. 8. As shown in FIG. 7, the projecting end portion of the stud is rectangular in cross section. The center portion of the projecting end of the stud is cut away at 98 (FIG. 12) in the shape of an inverted T to form a pair of transversely spaced legs 99 and 99', each having an inwardly projecting lug or shoulder 100 at the end thereof. These transversely spaced, facing shoulders are engageable by bolt member P, as hereinafter described, to lock the caster on the runner. The stud may be formed integrally with the runner body B'. However, as in the first embodiment, it is preferred that the stud be provided as a separate member and made of steel for strength. One end of the stud member is received by a rectangular opening 102 in the runner body, as shown in FIG. 8. As shown in FIG. 12, corner portions of predetermined thickness at that end of the stud are bent to form oppositely projecting lugs or flanges 104 and 106, each flange extending both longitudinally and transversely from the stud. These flanges are cooperable with shoulders 108 of the runner, which are formed by a rectangular enlargement 110 of opening 102, for holding the stud in place against bottom wall S of the luggage case section. The fixed or rigid caster D' shown attached to runner A' in FIGS. 7 and 8 includes a roller E, a roller housing F', and a cap Q in addition to bolt member P. Referring to FIG. 7, roller housing F' has a pair of transversely spaced side walls 112 and 114 which project perpendicularly from an end wall 116. Side wall 112 comprises a planar central portion 112a between curved wall portions 112b. Similarly, side wall 114 has a planar wall portion 114a and curved wall portions 114b.

Figures 9, 10, 11:
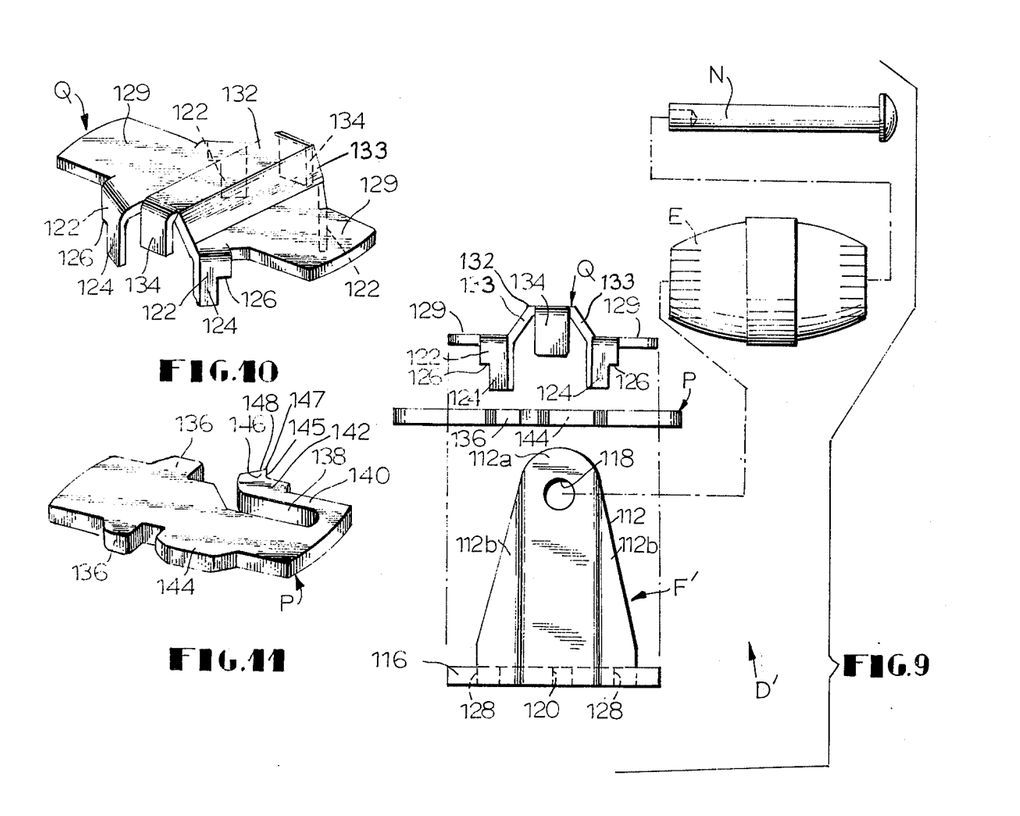
FIG. 9 is an exploded side elevational view of the caster of FIGS. 7 and 8.
FIG. 10 is a perspective view of a cap employed in the caster of FIGS. 7 and 8.
FIG. 11 is a perspective view of the bolt member employed in the caster of FIGS. 7 and 8.

As shown in FIGS. 8 and 9, roller E is supported for rotation between the side walls by a pin N having its opposite ends secured in openings 118 (FIG. 7) in planar wall portions 112a and 114a. End wall 116 has a transversely elongated rectangular opening 120 for receiving stud C' when the caster is attached to the runner A', as shown in FIG. 8. i Locking bolt member P is supported for sliding longitudinal movement between side walls 112 and 114 and adjacent end wall 116 of roller housing F' by cap Q. As shown in FIG. 10, the cap has four lugs 122 extending perpendicularly from planar end portions 129, each of the lugs providing a tab 124 and an adjacent shoulder 126. Referring to FIG. 7, tabs 124 are received by corresponding rectangular openings 128 in end wall 116 of the roller housing and are bent over as shown in FIG. 8 to secure the cap to the end wall, thereby providing a fully enclosed, assembled unit. Shoulders 126 on lugs 122 engage the end wall of the roller housing to provide clearance for the bolt member between the end wall and the planar end portions 129 of the cap, as shown in FIG. 8. Generally rectangular recesses 130 (FIG. 7) in the bottom surface of recess 88 of runner body B' receive the bent-over tabs 124 when the caster is attached to the runner, as shown in FIG. 8. The cap Q is transversely crimped to provide a clearance for stud C', the rectangular central portion 132 of the cap being spaced from and parallel to the plane of end portions 129 of the cap and being joined to those end portions by sloping walls 133. Referring to FIG. 10, the transverse ends of central portion 132 are bent over at right angles to provide transversely spaced lugs 134 which engage end wall 116 of the roller housing on opposite sides of opening 120, as shown in FIG. 7.

Referring to FIG. 11, bolt member P, which preferably is made of steel, comprises an elongated plate having a pair of lugs 136 projecting from opposite sides near one end thereof. The bolt member is cut away at 138 to form a resilient finger 140 which extends longitudinally along one side of the bolt member. An outwardly facing lug 142 is formed at the end of finger 140, and an outwardly projecting lug 144 is provided centrally on the other side of the bolt member in transverse alignment with lug 142.

When caster D' is positioned on runner A', as shown in FIG. 8, with the bolt member in the locking position (shown most clearly in FIG. 7), lugs 142 and 144 of the bolt member engage the undersides of shoulders 100 of stud C' to releasably lock the caster to the runner. Moreover, the transverse width of the bolt member at lugs 142 and 144 when the resilient finger 140 is relaxed or unflexed (FIG. 11) preferably is slightly greater that the distance between legs 99 and 99' of the stud so that lugs 142 and 144 are biased into engagement with legs 99 and 99', respectively, when the bolt member is in locking position. As shown in FIG. 7, lugs 136 of the bolt member and side wall portions 112b and 114b cooperate to limit leftward movement of the bolt member in locking position. On the other hand, a camming surface 145 on detent 146 on lug 142 at the end of finger 140 is cooperable with leg 99 of the stud to resiliently oppose rightward movement of the bolt member toward unlocked position.

Figure 13:
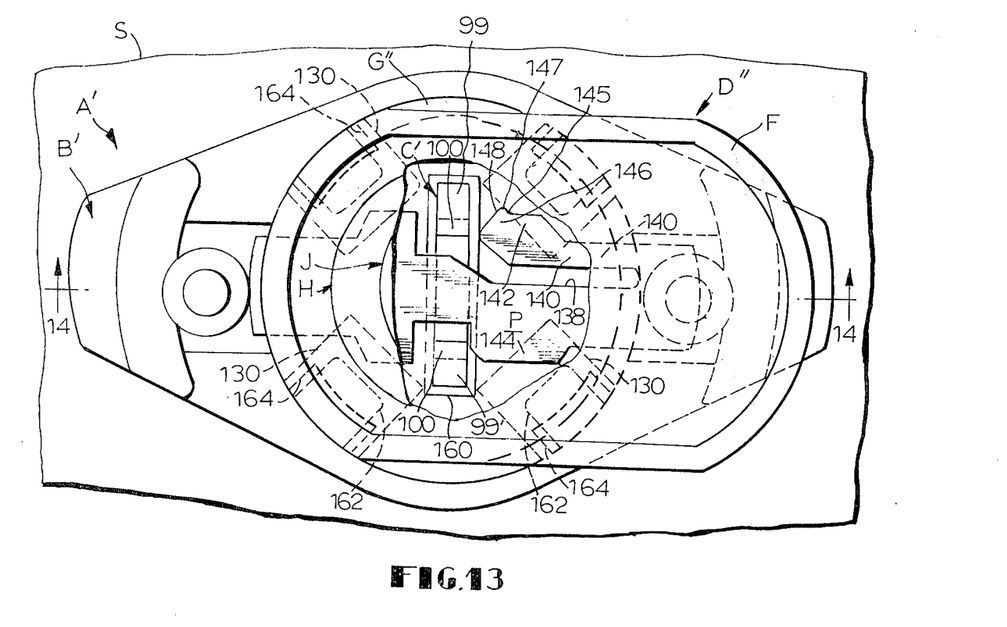
FIG. 13 is similar to FIG. 7, this view, however, showing the bolt member in release position and the caster being of the swivel type instead of the rigid type.

To disconnect the caster from the runner, the bolt member is first moved rightwardly from the position of FIG. 7 to an unlocking or release position, wherein lugs 142 and 144 are shifted out of alignment with shoulders 100 (FIG. 12) on stud C'. Such a release position is shown in FIG. 13, for example, which illustrates a swivel caster (described later) employing an identical bolt member. During this movement of the bolt member, which can be effected by a finger or by means of a coin held in the hand, camming surface 145 on detent 146 cooperates with leg 99 of the stud to urge the resilient finger 140 inwardly to bring the tip 147 of the detent into sliding contact with leg 99. When the detent is subsequently moved out of engagement with leg 99, the finger 140 snaps into its relaxed position, shown in FIG. 13. When the bolt member is moved fully into release position, the narrow portion of the bolt member between lugs 136 on one hand and lugs 142 and 144 on the other hand, is received in the cutaway portion 98 of the stud. The transverse width of this narrow portion is somewhat less than the distance between shoulders 100 so that the caster can be removed by being pulled off the stud.

Referring to FIG. 8, to attach the caster to the runner, end wall 116 of the roller housing is aligned with recess 88 of runner body B' as the caster is pushed toward the runner so that slot 120 (FIG. 8) in the end wall is aligned to receive the stud. When the caster is in position, the bolt member is moved leftwardly from the release position to the locking position of FIGS. 7 and 8 so that lugs 142 and 144 are aligned with shoulders 100 on the stud. During this movement of the bolt member, camming surface 148 on detent 146 is cooperable with leg 99 of the stud to urge the resilient finger 140 inwardly, bringing the tip 147 of the detent into sliding contact with leg 99. When the bolt member reaches the position in which the tip of the detent is moved beyond leg 99, finger 140 snaps outwardly to the position of FIG. 7.

In addition to allowing attachment of the caster without the use of tools and with a minimum of effort, the solid bolt member holds the caster firmly in place so that sudden jarring or dropping of the luggage cannot cause the caster to become detached.

Figure 14:
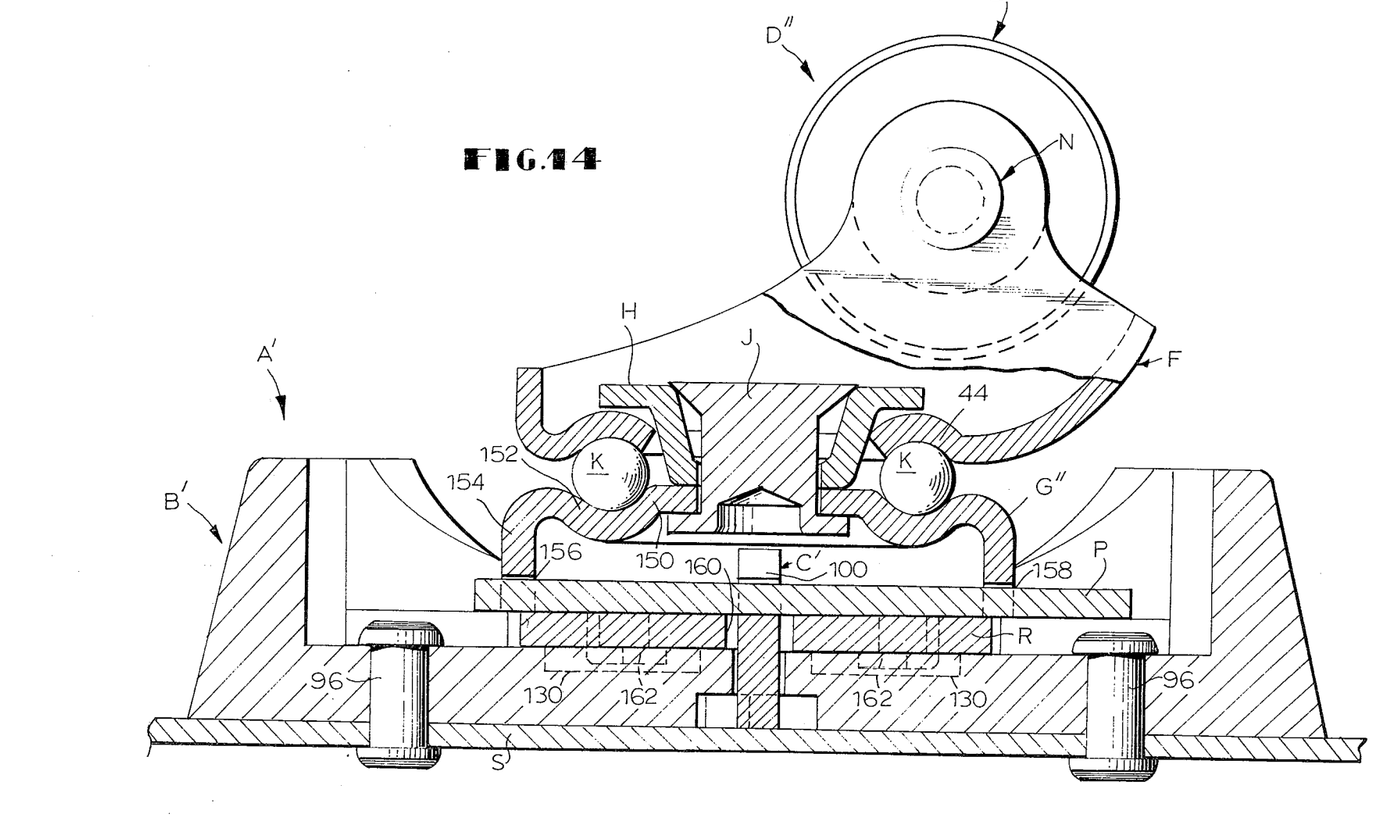
FIG. 14 is vertical cross-sectional view, on an enlarged scale, taken approximately in the plane of line 14—14 of FIG. 13.
Figure 15:
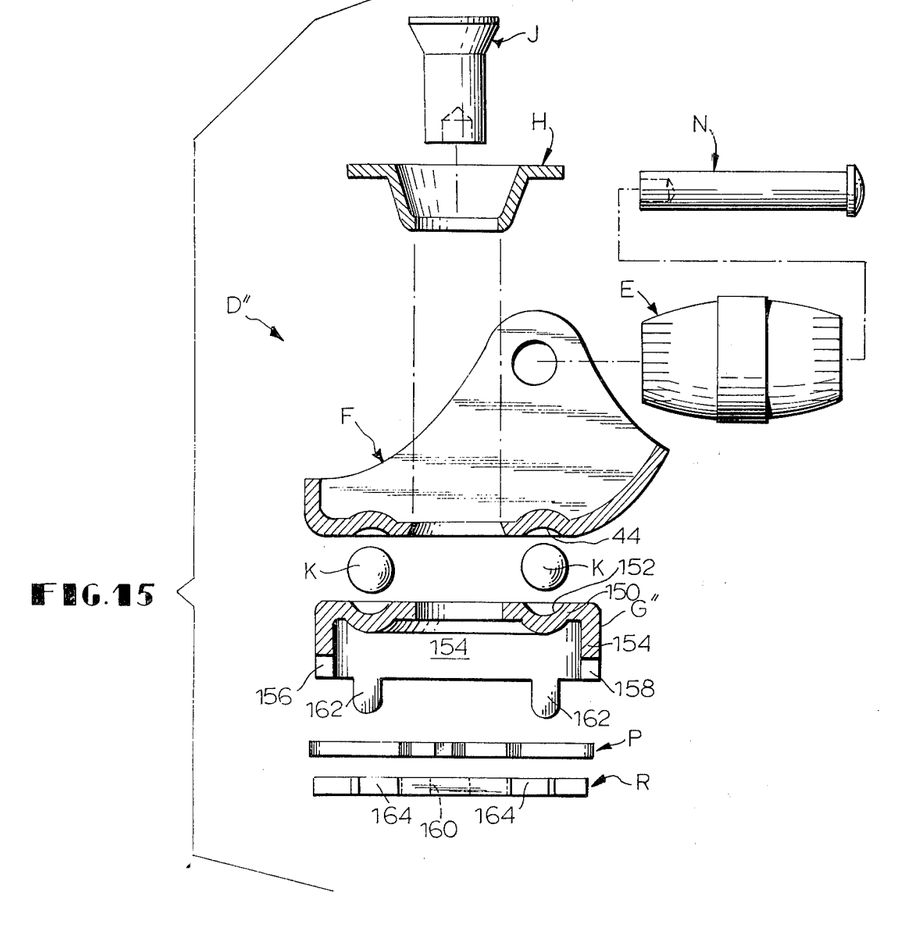
FIG. 15 is an exploded side elevational view, partly in cross section, of the caster of FIGS. 13 and 14.

FIGS. 13 and 14 illustrate a swivel caster D'' positioned for attachment to runner A' of FIGS. 7 and 8 employing the slidable bolt member P just described. As shown in FIG. 15, the caster includes a roller E, a roller housing F, a pin N, a cap H, a rivet J, and balls K similar to those described above with reference to the embodiment of FIGS. 1–3. Referring to FIG. 14, a swivel plate or housing G'' is pivotally connected to roller housing F by rivet J and has an end wall 150 with an annularly recessed portion 152 in alignment with annularly recessed portion 44 of the roller housing, the recessed portions receiving the balls K to provide a ball-bearing-type swivel action.

Bolt member P is slidably supported in diametrically opposite notches 156 and 158 in the edge of tubular side wall 154 of the swivel plate by a circular cover plate R, which has a transverse rectangular slot 160 therein for receiving the stud, as shown in FIG. 13. Side wall 154 of the swivel plate has four lugs or tabs 162 (FIG. 15) which are received in aligned notches 164 (FIG. 15) in the periphery of the cover plate, as shown in FIG. 13. These tabs are bent over as shown in FIG. 14 for securing the cover plate to the swivel plate, the bent-over tabs being received by the recesses 130 (FIG. 14) in the runner body when the caster is attached to the runners.

When bolt member P is in the release position shown in FIGS. 13 and 14, lugs 142 and 144 of the bolt member are disengaged from shoulders 100 of stud C', thereby permitting removal of the caster from runner A'. To releasably lock the caster to the runner, the bolt member is moved leftwardly from the release position to a locking position in which lugs 142 and 144 of the bolt member engage shoulders 100 on the stud. The locking position for this embodiment is the same as the locking position shown in FIG. 7, which illustrates the rigid caster described previously.

As pointed out above, the luggage case runners of the invention enable attachment thereto of either swivel or fixed casters, such as the preferred casters described above, without the use of tools, and further provide the support surfaces for a luggage case when casters are not attached. This permits a retailer of luggage cases having such runners to sell the same luggage case either with or without the casters, depending upon the requirements of the customer. If the customer is not sure that he needs a luggage case having casters, he can purchase a luggage case having the runners of the invention without purchasing a set of the casters, with the knowledge that he can purchase the casters later if they are needed. The casters of the invention may be attached by the retailer at the time of sale of the luggage case, if so requested by the purchaser, or may be attached by the purchaser at his convenience. Moreover, the fact that the casters may be removed from the runners, permits the casters to be attached for temporary use and also enables the purchaser to employ a single set of the casters with any one of several luggage cases having similar runners in accordance with the invention.

It is believed that the advantages and improved results furnished by the runners and attachable casters of the invention will be apparent from the foregoing description of several preferred embodiments of the invention. Various changes and modifications may be made without departing from the spirit and scope of the invention as sought to be defined in the following claims.

We claim:

1. A runner adapted to be secured to the bottom of a luggage case or the like for enabling connection thereto of an attachable caster, the runner comprising a runner body having a recess therein, a stud connected to the body and positioned in the recess so that no portion thereof extends beyond the recess, whereby the runner will engage a floor when a caster is not attached to the stud, the stud having means engageable by the caster.

2. A runner as set forth in claim 1, wherein the body has a pair of additional recesses on opposite sides of and of lesser depth than the first-mentioned recess.

3. A runner as set forth in claim 1, wherein the means engageable by the caster comprises shoulder means on the stud.

4. A runner as set forth in claim 3, wherein the shoulder means comprises an outer shoulder on the stud, and wherein the projecting end surface of the stud is tapered.

5. A runner as set forth in claim 3, wherein the shoulder means comprises spaced, inwardly projecting shoulders.

6. A runner as set forth in claim 1, wherein the projecting end portion of the stud is generally circular in cross section.

7. A runner as set forth in claim 1, wherein the projecting end portion of the stud is generally rectangular in cross section.

8. A runner as set forth in claim 1, wherein the runner body and stud are formed as separate parts, and wherein the runner body has an opening therein for receiving the stud, the runner body and the stud having cooperable means for maintaining the stud in the opening.

9. A caster for releasable attachment to a luggage case runner or the like having a stud thereon, the caster comprising:

a roller supported by a roller housing; and means engageable with the stud for attaching the roller housing to the runner, the means engageable with the stud comprising a movable locking member connected to the caster, the locking member being movable to a first position for engaging the stud and to a second position for disengaging the stud.

10. A caster as set forth in claim 9, wherein the means engageable with the stud comprises a resilient member.

11. A caster as set forth in claim 10, wherein the resilient member comprises a spring clip having resilient fingers for snapping into engagement with the stud.

12. A caster as set forth in claim 10, wherein the roller housing is rotatably connected to an additional housing, and wherein the resilient member is held in the additional housing by a cover plate having an opening therethrough for receiving the stud, the resilient member having means engageable with shoulder means on the stud when the stud is received through the opening.

13. A caster as set forth in claim 10, wherein the slidable locking member comprises a bolt member.

14. A caster as set forth in claim 13, wherein the bolt member has oppositely facing lug portions for engaging spaced inner shoulders on the stud.

15. A caster as set forth in claim 13, wherein the bolt member has resilient means cooperable with the stud for resiliently maintaining the bolt member in the first position.

16. A caster as set forth in claim 13, wherein the roller housing has a pair of spaced side walls supporting the roller therebetween and an end wall provided with an opening for receiving the stud, and wherein the caster further comprises means for supporting the bolt member for sliding movement between the side walls and adjacent the end wall.

17. A caster as set forth in claim 13, wherein the roller housing is rotatably connected to an additional housing, and wherein the bolt member is supported for sliding movement in the additional housing by a cover plate mounted to the additional housing, the cover plate having an opening therethrough for receiving the stud.

18. A caster as set forth in claim 10, wherein the roller housing is rotatably connected to an additional housing, and wherein the means engageable with the stud is contained in the additional housing.

* * * * *